US006802447B2

(12) United States Patent
Horng

(10) Patent No.: US 6,802,447 B2
(45) Date of Patent: Oct. 12, 2004

(54) METHOD OF AUTHENTICATING AN OBJECT OR ENTITY USING A RANDOM BINARY ID CODE SUBJECT TO BIT DRIFT

(75) Inventor: Chi-Song Horng, Palo Alto, CA (US)

(73) Assignee: ICID, LLC, Palo Alto, CA (US)

( * ) Notice: Subject to any disclaimer, the term of this patent is extended or adjusted under 35 U.S.C. 154(b) by 0 days.

(21) Appl. No.: 10/228,678

(22) Filed: Aug. 26, 2002

(65) Prior Publication Data
US 2004/0035919 A1 Feb. 26, 2004

(51) Int. Cl.[7] .............................................. G06F 17/00
(52) U.S. Cl. ..................................... 235/375; 700/116
(58) Field of Search ................................. 235/375, 385, 235/487; 716/4, 8; 702/73; 364/468.22, 468.23; 700/115, 116, 117; 713/168, 185; 717/106

(56) References Cited

U.S. PATENT DOCUMENTS

| | | | |
|---|---|---|---|
| 4,630,201 A | | 12/1986 | White |
| 5,350,715 A | * | 9/1994 | Lee .............................. 438/16 |
| 5,367,148 A | | 11/1994 | Storch et al. |
| 5,642,307 A | * | 6/1997 | Jernigan ..................... 365/103 |
| 5,818,738 A | * | 10/1998 | Effing ......................... 702/117 |
| 6,161,213 A | | 12/2000 | Lofstrom |
| 6,212,638 B1 | | 4/2001 | Lee et al. |
| 6,390,362 B1 | | 5/2002 | Martin |
| 6,480,136 B1 | * | 11/2002 | Kranz et al. ................ 341/159 |
| 6,600,686 B2 | * | 7/2003 | Huh et al. ................... 365/201 |
| 6,601,008 B1 | * | 7/2003 | Madge ........................ 702/117 |

* cited by examiner

Primary Examiner—Diane I. Lee
(74) Attorney, Agent, or Firm—Daniel J. Bedell; Smith-Hill and Bedell

(57) ABSTRACT

Each object (such as for example an integrated circuit) of a population of similar objects is configured to generate instances of a dynamic binary identification code (ID) that differ from instances of IDs generated by all other member objects of the population. While bits residing in most of the bit positions of the ID generated by each member object of the population do not vary in state from instance-to-instance of that ID, bits residing in one or more of the bit positions of the ID may vary (drift) in state from instance-to-instance of that ID. A set of instances of the ID generated by each member object of the population are analyzed to construct a separate "drift profile" for each member object's ID indicating for each bit position a probability that the bit position will contain a bit of a particular state. Thereafter, to verify that a particular object is a specific member object of the population, a set of instances of the ID generated by that particular object is analyzed to construct a drift profile for that particular object's ID. That drift profile is then compared to the drift profiles of the IDs generated by the member objects of the population to determine whether the particular object is a certain specific member object of the population.

20 Claims, 2 Drawing Sheets

METHOD OF AUTHENTICATING AN OBJECT OR ENTITY USING A RANDOM BINARY ID CODE SUBJECT TO BIT DRIFT

BACKGROUND OF THE INVENTION

1. Field of the Invention

The present invention relates in general to random binary identification codes (IDs) subject to bit drift, and in particular to a method of authenticating an object that is, or has attached to it an apparatus, which in turn is, capable of generating such an ID code.

2. Description of Related Art

There are many forms of identification (ID), and IDs are used for many purposes. For example an ID may be provided in printed form (e.g., user-names or bank account numbers), in graphical form (e.g., a picture on a driver license or a barcode on a product), in the form of a magnetic field (e.g., as provided by a magnetic strip on a credit card), as an electronic code conveyed by a signal.

An ID may be used to indicate the type of object bearing the ID. For example, a barcode-encoded UPC on a cereal box in a grocery store enables a grocer to determine the price of the goods when all boxes of the same kind of cereal are printed with the same barcode. An ID may be used to distinguish an object from a population of similar objects. For example a user-name may distinguish one user of a computer network service from all other users of the service, or a bank account number may uniquely distinguish a customer account from all other bank accounts. An ID can be used to confirm that the bearer of an ID is a genuine member of a population. For example, a photograph on a driver's license is a form of ID used to confirm that the bearer of the driver's license is the individual named on the driver's license.

Signals conveying binary strings are often used as ID codes. For example each instance of a particular type of integrated circuit (IC) chip can be made to generate an output signal conveying a unique binary code ID. The ID generated by each IC may be used to distinguish that IC from among all other ICs, to verify that the particular IC is a genuine legitimate copy of an IC and not an illegitimate counterfeit. The ID generated by an IC can also be used to identify any larger electronic system in which it is incorporated. "Radio Frequency Identification" tags (RFIDs) are ICs that produce radio frequency signals conveying binary IDs. When the RFIDs are attached to objects, such as for example merchandise in a retail store, packages for delivery, the unique radio frequency ID codes they generate can serve the same identification purposes as barcodes.

There are many economic or other incentives for people to misuse IDs. For example when an ID identifies goods as having been produced by a particular source, a source of counterfeit goods would want to provide the counterfeit goods with IDs that incorrectly identify them as having been produced by that particular source. Thus counterfeiters not only try to counterfeit goods, they also seek to counterfeit IDs that are associated with those goods. Accordingly efforts have been made to render IDs difficult to copy or counterfeit. For example sophisticated procedures/algorithms and manufacturing processes are sometimes used to make IDs that are difficult for a counterfeiter to copy. A hologram is one example of a difficult to reproduce ID. Sometimes IDs are hidden or encoded in a way that makes it difficult for a would-be counterfeiter to discover them.

One way to foil an ID counterfeiter is to make it hard for the counterfeiter to determine which part of a code is actually being used as an ID. U.S. Pat. No. 5,367,148, issued Nov. 22, 1994 to Storch et al., entitled "Counterfeit detection using ID numbers with at least one random portion," teaches the techniques of adding one or more "random" portions (each consisting of one or more digits) to an otherwise straightforward numerical ID, and of purposely using different presentations in the "external" appearance (e.g. as printed on the outside package box) of the ID and the "inner" appearance (e.g. inside the box on a customer return registration card), for detecting counterfeits. U.S. Pat. No. 6,212,638, issued Apr. 3, 2001 to Lee et al., entitled "Method for generating unpredictable authentication identification symbols," teaches use of special mathematical functions to generate sequences of unpredictable ID symbols, and to employ an unpredictable subset of the symbols from such a sequence for an actual ID.

The IDs described by the above-mentioned prior art techniques are "static" in that, once a particular copy of an ID is generated, it stays the same each time the ID is presented. For example a barcode ID, once printed, never changes its appearance. A product serial number, once imprinted on the casing of a product or printed on a customer registration card, never changes its value. A user-name for logging into an on-line service remains the same once assigned.

U.S. Pat. No. 6,161,213, issued Dec. 12, 2000 to Keith Lofstrom, entitled "System for providing an integrated circuit with a unique identification," describes a circuit (currently marketed under the trademark "ICID") that may be incorporated into an IC chip for generating a unique ID for each IC in which it is embedded without requiring each IC to be separately processed. The ICID circuit includes an array of cells, and each cell controls the state of a separate bit of the ID to be generated based on relative doping levels within channels of transistors forming a part of the cell. Since the doping level randomly varies from transistor-to-transistor within an IC as a result of random process variations, the bit sequence of the ID produced by each copy of the ICID circuit is randomly established as the IC is fabricated. When the ID has a sufficiently large number of bits, the ID generated by each copy of the ICID circuit is highly likely to be unique even though a very large number of copies of the ICID circuit are manufactured.

The doping levels of the transistors of one or more of the ID cells of any given copy of an ICID circuit may be so similar that environmental variables such as ambient temperature and supply voltages can influence the ID bit state controlled by those cells. One characteristic of binary IDs produced by the ICID circuit is that a very small percentage of the bits of the ID it generates may not always be of the same state each time the ICID circuit generates the ID; the state of one or more bits of an ID may "drift" in that it changes from instance-to-instance of the generated ID. Thus the ID that the ICID circuit produces is "dynamic" in that it does not always have exactly the same value each time it is generated. However Lofstrom teaches that even though a few bits of each individual ID may drift, the ID can still be used to uniquely identify each IC from among a large population of ICIDs producing such IDs if the ID has a sufficiently large number of bits. Lofstrom teaches that two sufficiently long IDs may be considered with a high degree of confidence to have been produced by the same copy of an ICID circuit even though a few of their corresponding bits are not of matching states.

BRIEF SUMMARY OF THE INVENTION

The invention relates to a method for verifying that a particular object, such as for example an integrated circuit (IC), is a member of a population of similar objects.

In accordance with the invention, each population member is configured to generate a binary identification code (ID) that differs from IDs generated by all other members of the population. The ID generated by each member is dynamic in that all instances of the ID generated by a population member may not always have exactly the same value. While bits residing in most of the bit positions of a dynamic ID generated by any population member do not vary in state from instance-to-instance, bits residing in one or more other bit positions of the ID may "drift" in that they may vary in state from instance-to-instance of that ID.

A set of instances of the ID generated by each population member is analyzed to produce a separate "representative bit pattern" for the ID indicating the most commonly occurring state of each bit of the member's ID. The set of ID instances generated by each population member are also processed to determine a "drift profile" for that member's ID, the drift profile indicating for each bit position of the ID whether the bit in that position drifts and the probability that the bit position will contain a bit of a particular state. Thereafter, to verify that a particular object is a member of the population of objects, an instance of the ID of the particular object is first compared to the representative bit patterns of the IDs of the members of the population. If a sufficient number of the bits of that instance of the ID of the particular object are not of the same state as similar bits of the representative bit pattern of the ID of any population member, then the ID of the particular object is considered not to match the ID of any population member, and the particular object is therefore considered to be other than a member of the population.

Otherwise, if a sufficient number of the bits of the instance of the ID of the particular object are of the same state as similar bits of the representative bit pattern of the ID of one specific member of the population, then the ID of the object is considered to "match" the ID of that specific member. In such case, several instances of the ID of the particular object are obtained, and a drift profile for the ID of the particular object is calculated from those several ID instances. The drift profile of the ID of the particular object is then compared to the drift profile of the particular member's matching ID to verify whether the particular object is that specific member of the population.

This ID verification system is more difficult to defeat than prior art systems that rely only on determining whether all, or a sufficient number, of the corresponding bits of two IDs are of matching states because it is more difficult for one to discover the drift profile of an ID that is subject to bit drift than to discover a single valid ID. It is also more difficult to produce a sequence of IDs having a particular drift profile than to produce a single ID having a particular set of fixed bit states. A would-be object counterfeiter might obtain a snapshot of one instance of an ID produced by a member of the population and attempt to adapt a counterfeit object to produce a static IC mimicking that particular ID instance, but the counterfeit object's ID would be static and would fail to present the correct drift profile and will therefore be discernable as a counterfeit. Since the drift profiles of the IDs produced by members of the population are random and unpredictable, a counterfeiter not having access to members of the population or to a drift profile database would find it difficult to produce counterfeit objects presenting legitimate drift profiles.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

Figure 1:
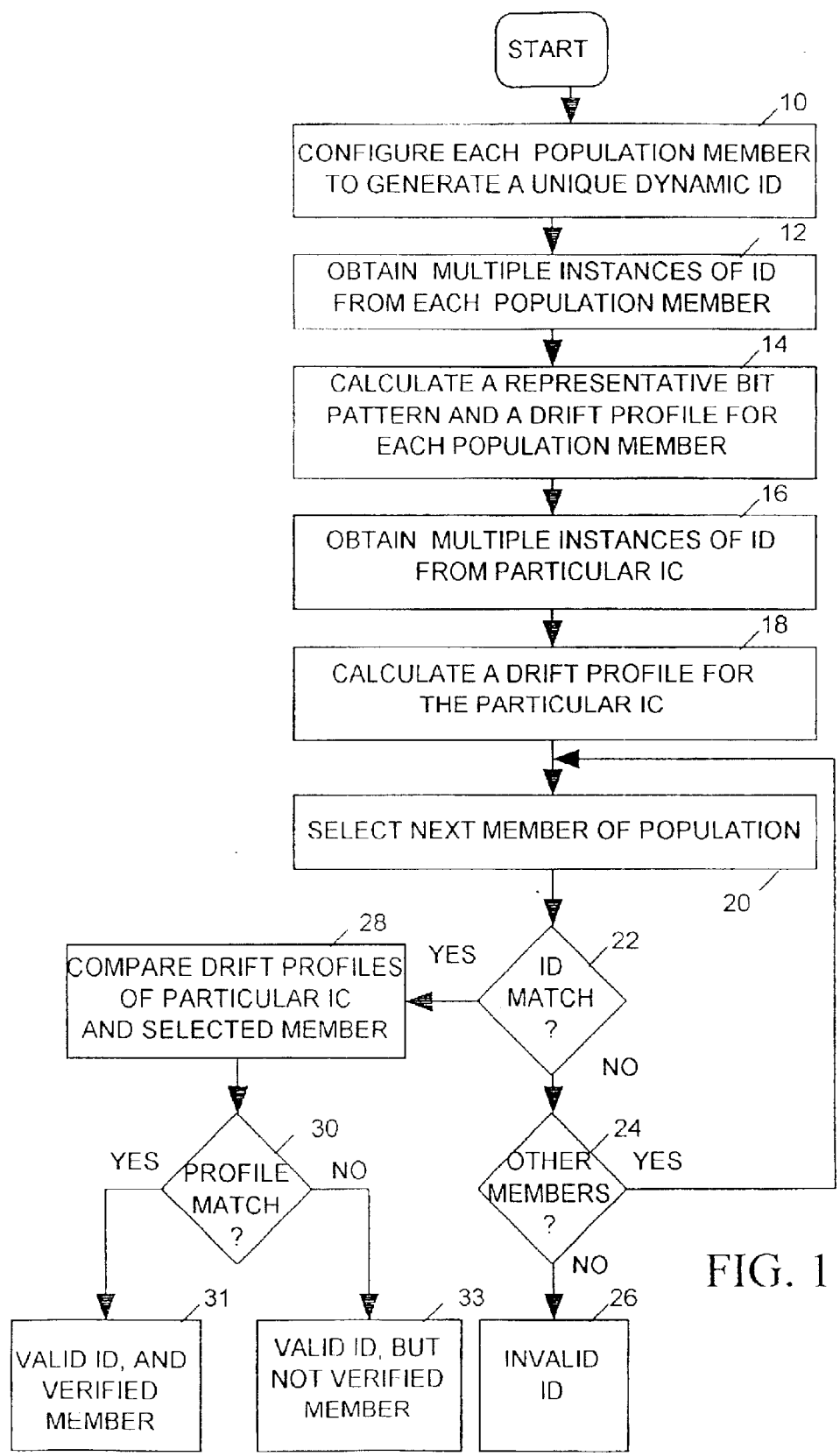
FIG. 1 is a flow chart illustrating a method in accordance with the invention for verifying the identity of an IC as being a specific member of a population of similar ICs.

This specification describes one or more exemplary embodiments and/or applications of the invention considered by the applicant(s) to be the best modes of practicing the invention. It is not intended, however, that the invention be limited to the exemplary embodiment(s) described below or to the manner in which the embodiments operate. The claims appended to the specification are intended to define the scope of the invention.

The invention relates to a method for verifying that a particular object is a member of a population of objects. In accordance with the invention, each member of the population of similar objects is configured to generate a dynamic binary identification code (ID) differing from IDs generated by all other members of the population. Each ID includes many bit positions, and while bits residing in most of the bit positions of the ID generated by each object do not vary in state from instance-to-instance of that ID, bits residing in one or more of the bit positions of each member's ID may vary in state ("drift") from instance-to-instance of that ID. A set of instances of the ID generated by each population member are analyzed to determine a separate "representative bit pattern" for each ID indicating the most commonly occurring state of each bit of the ID. For example, assume five instances of an ID are as follows:

{101101110 . . . 111}
{101100110 . . . 110}
{001100110 . . . 111}
{001101110 . . . 111}
{001101110 . . . 111}

A bit position that has a fixed 0 or 1 state will have that as its value in the representative bit pattern and a bit position that sometimes appears as a 0 and sometimes appears as a 1 will have the most commonly occurring state as its value. Thus for the above five instances the representative bit pattern will be as follows:

{001101110 . . . 111}

The set of instances of the ID generated by each population member are also analyzed to construct a separate "drift profile" for each member's ID, indicating for each bit position a probability that the bit position will contain a bit of a particular state. In the example above, the drift profile would indicate that the first bit (from left) would have a 40% chance of being a "1", that the second bit would have a 0% chance of being a "1", that the third bit would have a 100% chance of being a "1", etc.

Thereafter, to verify that a particular object generating instances of an ID is a member of the population, an instance of the ID of the particular object is first compared to the representative bit patterns of the IDs of the members of the population. If a sufficient number of the bits of that instance of the ID of the particular object are not of the same state as similar bits of the representative bit pattern of the ID of any population member, the particular object is considered to be other than a member of the population.

Otherwise, if a sufficient number of the bits of the acquired instance of the ID of the particular object are of the same state as similar bits of the representative bit pattern of the ID of one specific population member, then it is possible that the particular object is that specific member of the population. To verify whether the particular object is that specific member of the population, several instances of the ID of the particular object are obtained, and a drift profile for the ID of the particular object is constructed from those several ID instances. The drift profile of the ID of the particular object is then compared to the drift profile of the ID of that specific member of the population, and if the two drift profiles are sufficiently similar, the identify of the particular object as that specific member of the population is verified.

Thus the invention involves two verification steps to determine whether a particular object producing an ID is a specific member of a population. First, an instance of the ID of the particular object must be substantially similar to the representative bit pattern of the dynamic ID of that specific member of the population. Second, the drift profile of the ID of the particular object must be sufficiently close to the drift profile of the dynamic ID of that specific member of the population. The two-step ID verification method of the present invention is more difficult to defeat than prior art single-step verification methods that merely compare static or dynamic IDs to determine whether all, or a substantial portions of their bits are of matching states.

The following is a discussion of the use of the invention to determine whether a particular integrated circuit (IC) is a member of a population of similar ICs. While the invention is illustrated below as being used in connection with a system for verifying the identity of an individual integrated circuit (IC) as a specific member of a population of similar ICs, those of skill in the art will appreciate that the ID verification system of the present invention may be employed in a variety of other applications.

U.S. Pat. No. 6,161,213, issued Dec. 12, 2000 to Keith Lofstrom, incorporated herein by reference, describes an ID generation circuit (currently marketed under the trademark "ICID") that may be embedded in an IC for responding to an input signal by generating at an IC terminal carrying an output signal conveying a binary identification code (ID). The ICID circuit includes a set of cells, each of which controls the state of a corresponding bit of the ID to be generated. Each cell determines whether its corresponding ID bit is to be of either of two states (hereinafter referred to as states "1" and "0") based on relative doping levels within channels of transistors forming a part of the cell. Due to random process variations, the channel doping level randomly varies from transistor-to-transistor within an IC. The bit sequence of the ID produced by the ICID circuit is therefore randomly established when the ICID circuit is fabricated. Since the bit sequence of the ID produced by each copy of the ICID circuit is random, it is highly likely that each different copy of the ICID circuit will generate a unique ID, provided that the ID includes a sufficiently large number of bits.

In one or more of the ID cells of each copy of the ICID circuit, doping levels of the transistors will be so close to one another that environmental variables, mainly temperature and supply voltage, can influence the state of the ID bits controlled by those ID cells. Thus one characteristic of binary IDs produced by an ICID circuit is that some of the bits of the ID it generates may not always be of the same state in every instance of the ID. In other words, the ID produced by a specific copy of the ICID circuit can be "dynamic" in that the state of one or more bits of the ID may drift from instance-to-instance of the ID. However even though a few bits of a dynamic ID may drift, the ID produced by the ICID circuit can still be used to uniquely identify each IC from among a large population of ICs if the ID each ICID produces has a sufficiently large number of fixed bits that do not drift. Methods for determining whether two dynamic IDs are sufficiently similar so as to have been generated by the same ICID circuit are described in the aforementioned U.S. Pat. No. 6,161,213, incorporated herein by reference, and in co-pending U.S. patent application Ser. No. 10/124,860, filed Apr. 17, 2002, also incorporated herein by reference.

FIG. 1 illustrates an ID authentication method in accordance with the invention that makes use of the bit drift characteristics of the ID produced by an ICID circuit to determine whether an IC is a member of a population of ICs. Starting at step 10, each member of the population of ICs is configured to generate a unique N-bit ID subject to bit drift, for example by incorporating an ICID circuit into the design and layout of the IC and by manufacturing a population of such ICs. A set of M instances of the N-bit ID produced by each population member are obtained (step 12), which are then processed to determine a "representative bit pattern" and a "drift profile" for each member of the population (step 14). Thereafter, to verify that a particular (incoming) IC capable of generating instances of an ID is a member of the population, multiples instances of the particular IC's ID are obtained (step 16) and a drift profile for the ID of that particular IC is calculated based on the obtained instances of the ID (step 18). A member of the population of ICs is selected (step 20) and an instance of the ID of the particular IC is compared to the representative bit pattern of the ID of the selected member to determine whether they match (step 22).

If a sufficient number of the bits of that instance of the particular IC's ID are not of the same state as similar bits of the representative bit pattern of the ID of the selected member of the population, the ID is considered at step 22 to fail to match the representative bit pattern. Then if there are other members in the population whose representative bit patterns have not yet been compared to the ID of the particular IC (step 24), a next IC of the population is selected again (step 20) and the particular IC's ID is compared with the representative bit pattern of the ID of that next selected population member at step 22 to determine whether they are sufficiently close to be considered as matching.

The method continues to loop through steps 20–24 until an ID match is found at step 22, or until at step 24 the representative bit patterns of all ICs of the population have been checked without finding a match. When the representative bit patterns of all ICs of the population have been checked without finding a match (step 24), then the particular IC is determined to have an "invalid" ID that is not likely to have been produced by any IC of the population (step 26).

When the ID of the particular IC is found at step 22 to be sufficiently similar to the representative bit pattern of a population member, the particular IC's drift profile is then compared to the drift profile of the selected population member (step 28), and if the two drift profiles are sufficiently similar to be considered matching (step 30), then the particular IC is considered to have a valid ID and its identity as the last selected member of the population is reported as being verified (step 31). However if the two drift profiles are not sufficiently close to be considered matching (step 30), then while the ID of the particular IC is reported as being valid, the particular IC is reported as not being a verified member of the population (step 33).

A drift profile for a dynamic ID is suitably computed at steps 14 and 18 as a set of "drift ratios." Given that the bit in any particular position of an ID instance must be either of state 0 or 1, the "drift ratio" for each Jth bit position of an IC's ID is suitably the ratio of a number K of instances of the ID obtained at step 12 or 16 for which that bit position has state 1, to the total number M of instances of the ID obtained at step 12 or 16. Thus the drift ratio for each Jth bit position of a dynamic ID for which M instances of the ID are obtained will be:

1. 0/M=0 when the Jth bit position contains a fixed (non-drifting) bit of state 0;
2. M/M=1 when the Jth bit position contains a fixed (non-drifting) bit of state 1; and
3. 0<K/M<1 when the Jth bit position contains a drifting bit.

Accordingly the drift ratio for the Jth bit position of the dynamic ID is an experimentally determined probability that the bit at that position will be a 1 in any instance of the ID. For example, when M=100 and each ID has N=64 bit positions, the drift ratios for the 64 bit positions of the ID produced by one particular IC of the population might be as shown in Table I below.

TABLE I

| Bit Position | 1 | 2 | 3 | 4 | 5 | ... | 61 | 62 | 63 | 64 |
|---|---|---|---|---|---|---|---|---|---|---|
| Drift Position | 0 | 1 | .05 | 1 | .80 | ... | 0 | 1 | .35 | 0 |

The drift profile for the ID is therefore suitably the set of drift ratios fofr its bit positions:

{0, 1, 0.05, 1, 0.8, . . . , 0, 1, 0.35, 0}.

Those of skill in the art will appreciate that there are many possible ways to compare the drift profiles of IDs at step 28 and that many possible standards for determining whether they are sufficiently similar to consider them as matching drift profiles. One way to compare two drift profiles is to determine whether the following is true:

$$\sum_{J=1}^{N} |R1_J - R2_J| < T$$

where $R1_J$ is the drift ratio for the Jth bit position of the ID of a member of the population, $R2_J$ is the drift ratio for the Jth bit position of the ID of the particular IC to be verified as a being that member, and T is an empirically derived threshold. Thus the two drift profiles are considered to match if and only if the sum of the absolute values of the difference in drift ratios for all of their corresponding bit positions is less than some threshold value T.

An appropriate size for threshold value T depends on various parameters, including the number N of bits in the ID and the number M of instances of the ID that are sampled when constructing the drift profile. Increasing the number M of instances of an IC's ID processed at steps 14 and 18 when calculating a drift profile tends to reduce variations between calculations of an IC's drift profile based on separate groups of ID instances. Thus increasing M allows T to be made smaller, thereby making the verification method more discriminating by requiring the two drift profiles to be more similar to be considered matching. However T should always be made larger than 0 since variation in computing drift profile based on multiple instances of an ID produced by an IC cannot be totally eliminated.

While in the preferred embodiment of the invention, when constructing a drift profile, the drift ratio for each bit position of an ID is computed as the ratio K/M of the number K of ID instances in which the bit at that bit position is a "1" to the total number M of ID instances upon which the calculation is based, those of skill in the art will appreciate that a drift ratio could be computed from the values of K and M in many other ways provided suitable adjustments are made to the value of T.

Figure 2:
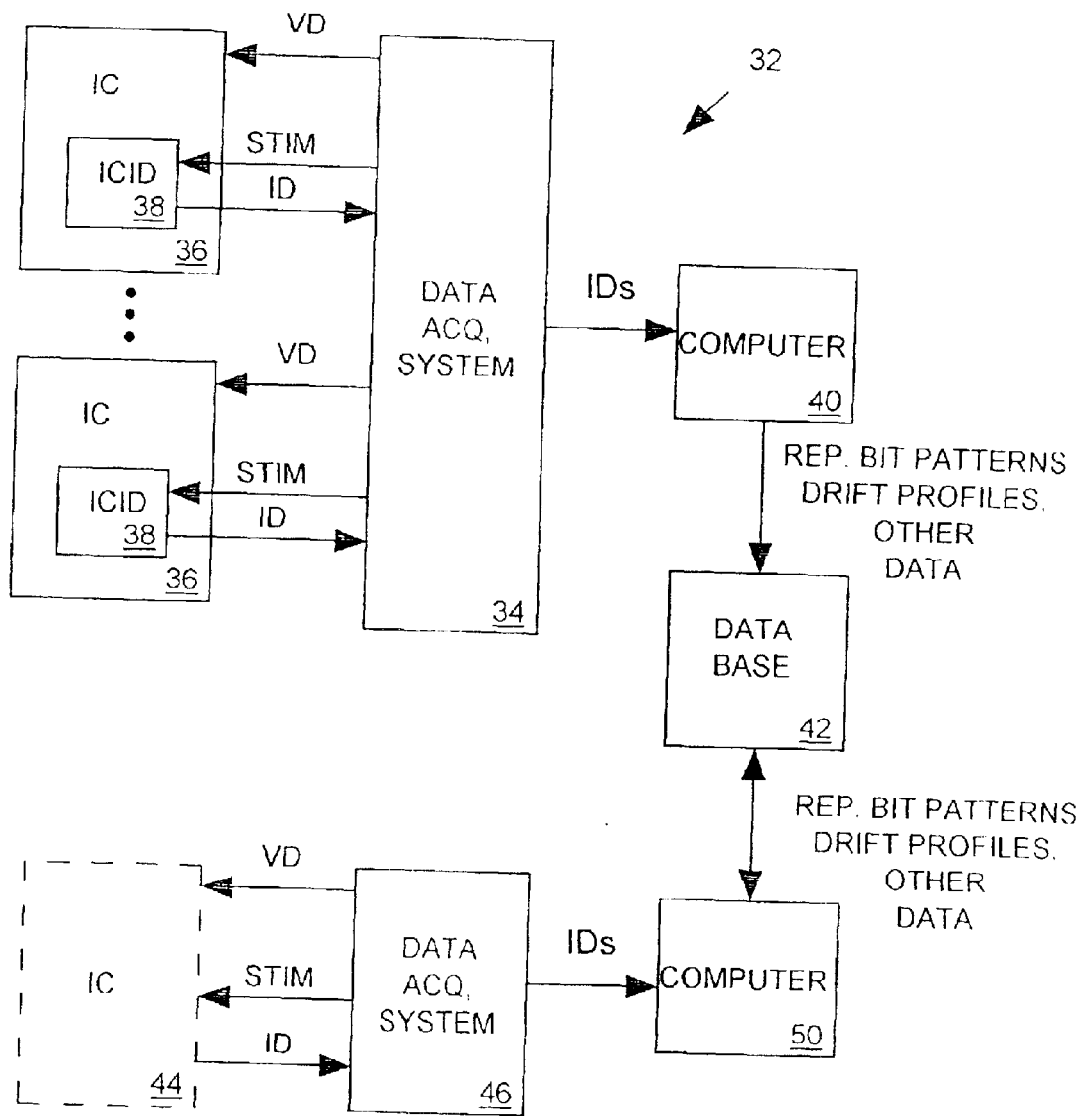
FIG. 2 is a block diagram depicting a system in accordance with the invention employing the method of FIG. 1.

FIG. 2 illustrates in block diagram form a system 32 for implementing the method of FIG. 1. A data acquisition system 34, such as for example, an integrated circuit tester, supplies a power signal VD to power IC 36 of a population of ICs and transmits a stimulus signal (STIM) to an ICID circuit 38 within each IC 36, causing each ICID circuit 38 to read out M instances of its ID. Data acquisition system 34 forwards the IDs generated by each ICID circuit 38 to a computer 40 which computes the represent bit pattern and drift profile of each IC 36 of the population and stores it in a database 42 along with other data regarding each IC such as, for example, lot number, wafer number, x/y location on wafer, date of manufacture, test results, etc.

Thereafter, to verify whether a particular IC 44 is one of ICs 36, a data acquisition system 46 supplying power VD and a stimulus signal (STIM) to IC 44 causes IC 44 to send M instances of its ID to data acquisition system 46, which forwards them to a computer 50. Computer 50 then searches the database 42 for a representative bit pattern for an ID of one of ICs 36 sufficiently similar to an instance of an ID of IC 44 to be considered matching. Upon finding an ID match, computer 50 computes a drift profile for the ID of IC 44 and determines whether that drift profile matches the drift profiles of the specific IC 36 having the matching representative bit pattern, to determine whether IC 44 is the same IC as that specific one of IC 36. Although IC 44 may be capable of generating a seemingly legitimate ID, it may or may not be a member of the population of IC's 36, and may or may not employ means other than an embedded ICID circuit to generate an output ID.

An ID produced by an IC can be used for purposes other than merely identifying the IC itself. For example, an ID produced by an ICID circuit within a computer processor can be employed as a dynamic ID for a computer engaging in transactions across a network. Thus when a server requests an ID from the computer, software in the computer can request the processor to read out its own ID so that the computer can pass it to the server. Using a verification system in accordance with the invention, the server would request the computer to read out and forward several instances of the ID so that the server could not only determine whether the ID is sufficiently close to a valid representative bit pattern, but could also compute a drift profile for the ID provided by the computer and compare it to the drift profile associated with that representative pattern to determine whether that computer is a valid source of that ID. The method in accordance with the invention may also be employed, for example, to verify identities of dynamic IDs generated by RFID devices.

While the ID verification system of the present invention has been illustrated above as being used for verifying the identity of an IC, those of skill in the art will appreciate that the system may be employed to identify any kind of object that can be adapted to generate instances of dynamic binary IDs. Therefore while the forgoing specification and the drawings depict exemplary embodiments of the best mode(s) of practicing the invention, and while elements or steps of the depicted best mode(s) exemplify the elements or steps of the invention as recited in the appended claims, the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

What is claimed is:

1. A method for verifying an identity of a particular object to determine whether the particular object is a specific member of a population of similar objects, the method comprising the steps of:
   a. configuring each member object to generate instances of a dynamic binary identification code (ID), wherein the ID generated by each member object differs from IDs generated by all other member objects of the population, wherein the ID generated by each member object includes a plurality of bit positions, wherein bits residing in most of the bit positions of the ID generated by each member object do not vary in state from instance-to-instance of that ID, and wherein bits residing in at least one other of the bit positions or the ID may vary in state from instance-to-instance of that ID;
   b. analyzing a set of instances of the ID generated by each member object of the population to produce a separate drift profile for each member object's ID indicating for each bit position of the ID a probability that the bit position will contain a bit of a particular state;
   c. analyzing a set of instances of the ID generated by a particular object to produce a particular drift profile for that object's ID; and
   d. comparing the particular drift profile to drift profiles of the IDs of member objects of the population to verify that the particular object is a specific member object of the population.

2. The method in accordance with claim 1 wherein each member object of the population is an integrated circuit.

3. A method for determining whether an object is a member of a population, the method comprising the steps of:
   a. configuring each member of the population to generate instances of a binary identification code (ID) having N bit positions, where N>2,
   wherein bits residing in some of the bit positions of each member's ID do not vary in state from instance-to-instance of that member's ID, and
   wherein a bit residing in at least one bit position of some members' IDs varies in state from instance-to-instance of those members' IDs;
   b. for each member of the population, analyzing a plurality of instances of an ID generated by that member of the population to produce a drift profile for that member's ID indicating whether, for each bit position of that member's ID, a bit residing at that bit position varied in state among the analyzed plurality of instances of that member's ID.

4. The method in accordance with claim 3 further comprising the step of:
   c. analyzing a plurality of instances of an ID having N bit positions generated by the object to produce a drift profile for that object's ID indicating whether, for each bit position of the object's ID, a bit residing at that bit position varied in state among the analyzed plurality of instances of the object's ID.

5. The method in accordance with claim 4 further comprising the step of:
   d. comparing the drift profile of the object's ID to a drift profile of the ID of a particular member of the population to determine whether the particular object is that particular member of the population.

6. The method in accordance with claim 3 further comprising the step of:
   c. for each member of the population, analyzing at least one instance of the ID generated by that member of the population to determine a representative ID for that member of the population.

7. The method in accordance with claim 6 further comprising the steps of:
   d. analyzing at least one instance of an ID having N bit positions generated by the object to determine a representative ID for that object; and
   e. comparing the representative ID for that object to the representative ID of a particular member of the population to determine whether it is possible that the object is that particular member of the population.

8. The method in accordance with claim 7 wherein step e comprises determining that is possible that the object is that particular member of the population by determining whether the representative ID of the object and the representative ID of that particular member have at least a minimum number of matching bits, wherein the minimum number is less than N.

9. The method in accordance with claim 7 further comprising the steps of:
   f. analyzing a plurality of instances of the ID generated by the object to produce a drift profile for that object's ID indicating whether, for each bit position of the object's ID, a bit residing at that bit position varied in state among the analyzed plurality of instances of the object's ID; and
   g. comparing the drift profile for the object's ID to the drift profile of the ID of the particular member of the population to verify that the object is the particular member of the population.

10. The method in accordance with claim 9
    wherein the drift profile for each member of the population includes, for each Jth bit position of the member's ID, a drift ratio $R1_J$ indicating a probability that the bit residing at the Jth bit is likely to be of a particular state, and
    wherein the drift profile for the object includes, for each Jth bit position of the object's ID, a drift ratio $R2_J$ indicating a probability that the bit residing at the Jth bit is likely to be of a particular state.

11. The method in accordance with claim 10 wherein the object is verified at step g to be the particular member of the population when, for the drift profile of the object's ID and the drift profile of the particular member's ID, $$\sum_{J=1}^{N} |R1_J - R2_J| < T$$

where T is a threshold number.

12. The method in accordance with claim 11 where T>0.

13. The method in accordance with claim 9 wherein the object and each member of the population is an integrated circuit.

14. The method in accordance with claim 3 wherein the drift profile for each member's ID indicates, for each bit position of that member's ID, a probability that the bit position will contain a bit of a particular state.

15. A method for determining whether an object is a member of a population, wherein each member of the population generates instances of a binary identification code (ID) having N bit positions, wherein the ID generated by each member of the population differs from IDs generated by other members of the population, wherein bits residing in some of the bit positions of each members' ID do not vary in state from instance-to-instance of that ID, wherein a bit residing in at least one bit position of some members' IDs varies in state from instance-to-instance of those members' IDs, and wherein the object generates instances of a binary identification code having N bit positions, the method comprising the steps of:

a. for each member of the population, analyzing a plurality of instances of the ID generated by that member of the population to produce a drift profile for that member's ID indicating whether, for each bit position of that member's ID, a bit residing at that bit position varied in state among the analyzed plurality of instances of that member's ID, and b. analyzing a plurality of instances of the ID generated by the object to produce a drift profile for the object's ID indicating whether, for each bit position of the object's ID, a bit residing at that bit position varied in state among the analyzed plurality of instances of the object's ID, and c. comparing the drift profile for the object's ID to a drift profile for the ID of a particular member of the population to determine whether the object is that particular member of the population.

16. The method in accordance with claim 15 further comprising the steps of:

d. for each member of the population, analyzing at least one instance of the ID generated by that member of the population to determine a representative ID for that member of the population;

e. analyzing at least one instance of the ID generated by the object to determine a representative ID for that object; and f. determining whether it is possible that the object is a particular member of the population by determining whether the representative ID of the object and a representative ID of a member of the population have at least a minimum number of matching bits, wherein the minimum number is less than N.

17. The method in accordance with claim 15 wherein the drift profile for each member of the population includes, for each Jth bit position of the member's ID, a drift ratio $R1_J$ indicating a probability that the bit residing at the Jth bit is likely to be of a particular state, and wherein the drift profile for the object includes, for each Jth bit position of the object's ID, a drift ratio $R2_J$ indicating a probability that the bit residing at the Jth bit is likely to be of a particular state.

18. The method in accordance with claim 17 wherein the object is determined at step c to be said member of the population when, for the object drift profile and the particular member's drift profile, $$\sum_{J=1}^{N} |R1_J - R2_J| < T$$

where T>0.

19. The method in accordance with claim 15 wherein the object and each member of the population is an integrated circuit.

20. The method in accordance with claim 15 wherein the drift profile for the ID of each member of the population indicates, for each bit position of that member's ID, a probability that the bit position will contain a bit of a particular state, and wherein the drift profile for the object's ID indicates, for each bit position of the object's ID, a probability that the bit position will contain a bit of a particular state.

* * * * *